United States Patent
Huang et al.

(10) Patent No.: US 12,248,396 B2
(45) Date of Patent: Mar. 11, 2025

(54) MEMORY SYSTEM AND A METHOD FOR GARBAGE COLLECTION OF THE MEMORY SYSTEM

(71) Applicant: Yangtze Memory Technologies Co., Ltd., Hubei (CN)

(72) Inventors: Huadong Huang, Wuhan Hubei (CN); Yonggang Chen, Wuhan Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 96 days.

(21) Appl. No.: 18/090,998

(22) Filed: Dec. 29, 2022

(65) Prior Publication Data

US 2024/0176736 A1 May 30, 2024

(30) Foreign Application Priority Data

Nov. 25, 2022 (CN) .......................... 202211494333.5

(51) Int. Cl.
*G06F 12/02* (2006.01)
*G06F 12/0817* (2016.01)
*G06F 12/1045* (2016.01)

(52) U.S. Cl.
CPC ...... *G06F 12/0253* (2013.01); *G06F 12/0822* (2013.01); *G06F 12/1063* (2013.01)

(58) Field of Classification Search
CPC ...... G06F 12/02; G06F 12/0253; G06F 12/08; G06F 12/0822; G06F 12/10; G06F 12/1063
See application file for complete search history.

(56) References Cited

U.S. PATENT DOCUMENTS

| 11,055,215 B2 * | 7/2021 | Amaki | G06F 11/1068 |
| 2018/0275914 A1 * | 9/2018 | Ke | G06F 3/061 |
| 2018/0373440 A1 * | 12/2018 | Shah | G06F 12/0804 |
| 2019/0006379 A1 * | 1/2019 | Kanno | G06F 3/0652 |
| 2020/0042438 A1 * | 2/2020 | Yi | G06F 12/0246 |
| 2021/0073121 A1 * | 3/2021 | He | G06F 12/0246 |

(Continued)

OTHER PUBLICATIONS

Yuping Ding and Xining Li, "Cache performance of chronological garbage collection," Conference Proceedings. IEEE Canadian Conference on Electrical and Computer Engineering (Cat. No. 98TH8341), Waterloo, ON, Canada, 1998, pp. 1-4.*

(Continued)

*Primary Examiner* — Pierre Michel Bataille
(74) *Attorney, Agent, or Firm* — Oblon, McClelland, Maier & Neustadt, L.L.P.

(57) ABSTRACT

Embodiments of the present disclosure provide a memory system, and a method for garbage collection of the memory system. The method can include reading N valid data sets in a to-be-collected virtual block (VB) of a memory out to a copy buffer sequentially, where N is an integer greater than or equal to 2, transferring a valid data set in the copy buffer to a corresponding cache, and reading a next valid data set out to the copy buffer, and programming the valid data set in the cache to a corresponding target die group of a target VB. A time period in which a current valid data set is programmed from the cache to the target die group corresponding to the cache overlaps at least partially with a time period in which a next valid data set is read from the to-be-collected VB to the copy buffer.

18 Claims, 6 Drawing Sheets

Read N valid data sets in a to-be-collected VB of a memory out to a copy buffer sequentially, wherein N is an integer greater than or equal to 2 — S201

Transfer a valid data set in the copy buffer to a corresponding cache, and read a next valid data set out to the copy buffer — S202

Program the valid data set in the cache to a corresponding target die group of a target VB, wherein a time period in which the current valid data set is programmed from the cache to the target die group corresponding to the cache overlaps at least partially with a time period in which a next valid data set is read from the to-be-collected VB to the copy buffer — S203

(56) References Cited

U.S. PATENT DOCUMENTS

2021/0103521 A1* 4/2021 Moore ................ G06F 12/10
2021/0200669 A1* 7/2021 Bianco ............ G06F 12/0253

OTHER PUBLICATIONS

C. Gao, L. Shi, C. J. Xue, C. Ji, J. Yang and Y. Zhang, "Parallel all the time: Plane Level Parallelism Exploration for High Performance SSDs," 2019 35th Symposium on Mass Storage Systems and Technologies (MSST), Santa Clara, CA, USA, 2019, pp. 172-184.*
G. Zhu, J. Han and Y. Son, "A Preliminary Study: Towards Parallel Garbage Collection for NAND Flash-Based SSDs," in IEEE Access, vol. 8, pp. 223574-223587, 2020.*

* cited by examiner (a)

(b)

(c)

MEMORY SYSTEM AND A METHOD FOR GARBAGE COLLECTION OF THE MEMORY SYSTEM

CROSS-REFERENCE OF RELATED APPLICATIONS

The present application claims the benefit of priority to China Application No. 202211494333.5, filed on Nov. 25, 2022, the content of which is incorporated herein by reference in its entirety.

TECHNICAL FIELD

The present disclosure relates to the field of semiconductor technologies, and in particular, to a memory system, a method and an electronic device for garbage collection of the memory system.

BACKGROUND

Garbage Collection (GC) may include the following steps: selecting a source virtual block (VB), that is, the VB to be collected; reading valid data from the source VB; programming the valid data to a target VB. Then, all the stored data in the source VBs may be erased to obtain new available VBs.

However, it can be desirable to further improve the processing speed of the above garbage collection process.

SUMMARY

The present disclosure provides a memory system, a method and an electronic device for garbage collection of the memory system. To achieve the above purpose, the technical solutions of the present disclosure may be implemented as in the following aspects.

According to a first aspect, an embodiment of the present disclosure provides a method for garbage collection of a memory system. The method can include reading N valid data sets in a to-be-collected virtual block (VB) of a memory out to a copy buffer sequentially, where N is an integer greater than or equal to 2, transferring a valid data set in the copy buffer to a corresponding cache, and reading a next valid data set out to the copy buffer, and programming the valid data set in the cache to a corresponding target die group of a target VB. A time period in which the current valid data set is programmed from the cache to the target die group corresponding to the cache overlaps at least partially with a time period in which the next valid data set can be read from the to-be-collected VB to the copy buffer.

According to a second aspect, an embodiment of the present disclosure provides a memory system, which includes a controller and a memory. The controller includes a processor and a copy buffer, and the memory includes a to-be-collected VB, a cache and a target VB. The processor is configured to read N valid data sets in the to-be-collected VB out to the copy buffer sequentially, wherein N is an integer greater than or equal to 2, transfer a valid data set in the copy buffer to a corresponding cache, and read a next valid data set out to the copy buffer, and program the valid data set in the cache to a corresponding target die group of the target VB. A time period in which the current valid data set is programmed from the cache to the target die group corresponding to the cache overlaps at least partially with a time period in which the next valid data set is read from the to-be-collected VB to the copy buffer.

According to a third aspect, an embodiment of the present disclosure provides an electronic device, which can include a memory system as described in the above technical solution.

According to a fourth aspect, an embodiment of the present disclosure provides a non-transitory computer-readable storage medium having computer programs stored thereon. The computer programs, when executed, implement the method for garbage collection of a memory system as described in the above technical solution.

Embodiments of the present disclosure provide a memory system, a garbage collection method and an electronic device thereof. In the garbage collection method of the memory system provided by the embodiments of the present disclosure, the period in which the current valid data set is programmed from the cache to the target die group corresponding to the cache at least partially overlaps the period in which the next valid data set is stored from the virtual block to the copy buffer. In other words, there is at least one time, that the process of programming the current valid data set from the cache to the target die group has not ended, and the process of reading the next valid data set from the virtual block to be collected to the copy buffer has started. In this way, the garbage collection processing speed may be effectively improved.

Embodiments of the present disclosure provides a memory system, a method and an electronic device for garbage collection of the memory system. In the method for garbage collection of the memory system according to an embodiment of the present disclosure, a time period in which a current valid data set is programmed from a cache into a target die group corresponding to the cache overlaps at least partially with a time period in which a next valid data set is read from a to-be-collected VB to a copy buffer. In other words, at least at a certain time instant, the process of programming the current valid data set from the cache to the target die group has not ended, and the process of reading the next valid data set from the to-be-collected VB to the copy buffer has started. In this way, the processing speed of garbage collection may be effectively improved.

BRIEF DESCRIPTION OF THE DRAWINGS

Various exemplary embodiments of this present disclosure that are proposed as examples will be described in detail with reference to the following figures, wherein like numerals reference like elements, and wherein.

DETAILED DESCRIPTION

The technical solutions of the present disclosure will be further elaborated below with reference to the accompanying drawings and in conjunction with specific embodiments of the description. It should be appreciated that, the described embodiments are only a part of exemplary embodiments of the present disclosure, rather than all the embodiments thereof. Other and further embodiments of the present disclosure may be devised without departing from the basic scope thereof by ordinary technicians in the art without doing creative work after reading the described embodiments, such other and further embodiments of the present disclosure belong to the protection scope of the present disclosure.

In the following description, for purposes of explanation, numerous specific details are set forth in order to provide a thorough understanding of one or more aspects of the present disclosure. It is appreciated for those skilled in the art that such aspects of the present disclosure may be practiced without one or more of these specific details. In other examples, in order to avoid confusion with the present disclosure, some technical details known in the art are not described. That is to say, not all features of the actual embodiment are described herein, and well-known functions and structures are not described in detail.

In order to provide a thorough understanding of the present disclosure, detailed steps and detailed structures will be provided in the following description to explain the technical solution of the present disclosure. The preferred embodiments of the present disclosure are described in detail as follows. However, in addition to these detailed descriptions, the present disclosure may also have other embodiments.

Figure 1:
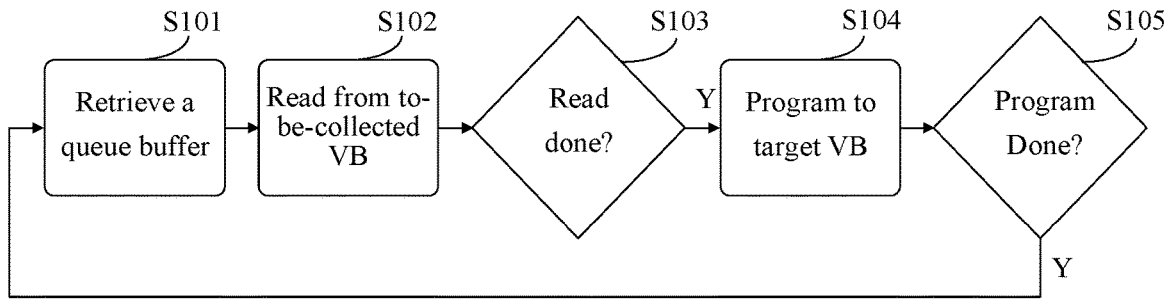
FIG. 1 is a block diagram illustrating a process for garbage collection.

FIG. 1 is a block diagram illustrating a process for garbage collection. As shown in FIG. 1, at step S101, a queue buffer is retrieved. Particularly, logical addresses/physical addresses (Logic Cell Addresses/Physical Cell Addresses, LCAs/PCAs) of a set of valid data in a virtual block (VB) to be collected are programmed into a retrieve queue buffer.

At step S102, reading from the VB to be collected is performed (Read from Source VB). Particularly, the set of valid data in the VB to be collected is read according to the logical addresses/physical addresses in the retrieve queue buffer.

At step S103, it is determined whether the reading of the set of valid data has been completed (Wait Read Done). If the determination is "Yes", it proceeds to step S104; if the determination is "No", it continues to perform the reading until the reading of the set of valid data is completed.

At step S104, programming to a target VB is performed (Program to Target VB). Particularly, the set of valid data in the VB to be collected is programmed into the target VB.

At step S105, it determined whether the programming of the set of valid data has been completed (Wait Program Done). If the determination is "Yes", it proceeds to step S101, at which the addresses of a next set of valid data in a VB to be collected are programmed into the retrieve queue buffer. If the determination is "No", it continues the programming until the programming of the set of valid data is completed.

In the above process for garbage collection, a set of valid data is programmed into the target VB after reading the set of valid data from the VB to be collected. That is, the set of valid data in the VB to be collected is moved to the target VB. And the moving (including reading and programming operations) of the next set of valid data is not performed until the moving (including reading and programming operations) of the current set of valid data is completed. Therefore, the process for garbage collection is a serial processing process, in which only one set of valid data is read or programmed at a same time. Therefore, it is desirable to further improve the processing speed of the garbage collection process.

Moreover, only one set of valid data is programmed at a same time, where the set of valid data is programmed into a corresponding target die group of the target VB. Then, programming operation is performed to only one target die group of the target VB at a same time, while the other target die groups of the target VB are idle, not making full use of these idle target die groups.

In view of the above situation, embodiments of the present disclosure provides a memory system, a method and an electronic device for garbage collection of the memory system. In the method for garbage collection of the memory system according to an embodiment of the present disclosure, a time period, in which a current set of valid data is programmed from a cache into a target die group corresponding to the cache overlaps at least partially with a time period, in which a next set of valid data is read from a VB to be collected to a copy buffer. In other words, at least at a certain time, the process of programming the current set of valid data from the cache to the target die group has not completed and the process of reading the next set of valid data from the VB to be collected to the copy buffer has started. In this way, the processing speed of the garbage collection may be effectively improved.

Figure 2:
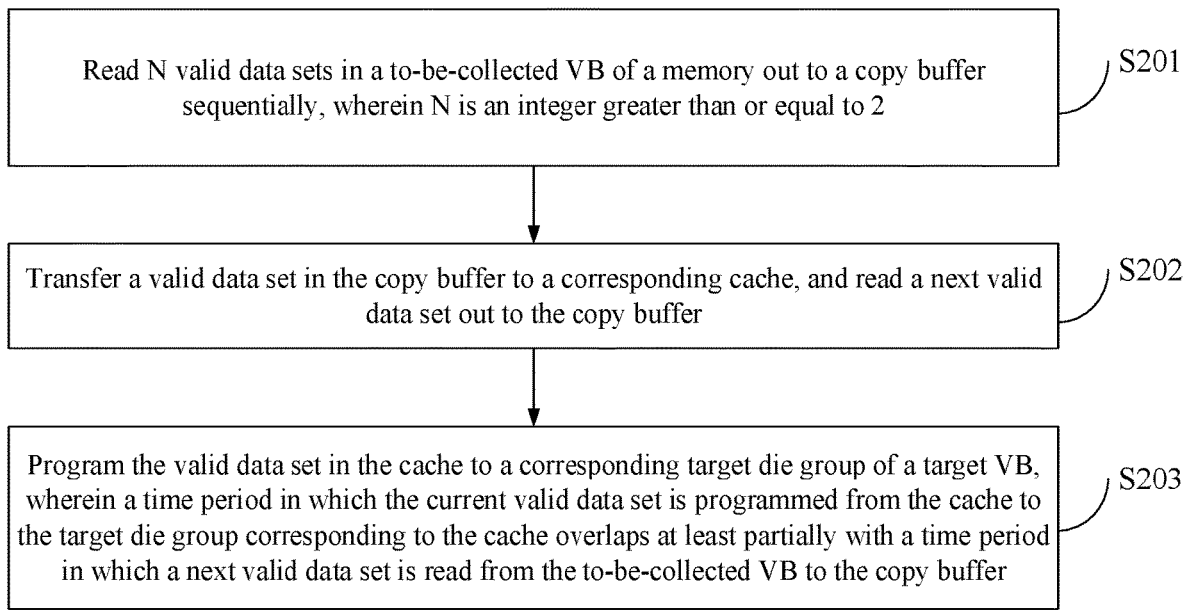
FIG. 2 is a flowchart illustrating a method for garbage collection of a memory system according to an embodiment of the present disclosure.

FIG. 2 is a flowchart illustrating a method for garbage collection of a memory system according to an embodiment of the present disclosure. As shown in FIG. 2, an embodiment of the present disclosure provides a method for garbage collection of a memory system.

At step S201, N sets of valid data in a to-be-collected VB of a memory are read out to a copy buffer in turn, where the N is an integer greater than or equal to 2.

At step S202, a set of valid data in the copy buffer is transferred to a corresponding cache, and a next set of valid data is read out to the copy buffer.

At step S203, the set of valid data in the cache is programmed to a corresponding target die group of a target VB, where the time period, in which the current set of valid data is programmed from the cache to the target die group corresponding to the cache, overlaps at least partially with the time period, in which the next set of valid data is read from a to-be-collected VB to the copy buffer.

A memory is usually composed of storage blocks. The storage blocks having the same storage block number (Block ID) on different dies and different planes are put together to form a VB. Firmware typically manages the memory in units of VBs. In embodiments of the present disclosure, a to-be-collected VB refers to a VB for which garbage collection needs to be performed when garbage collection of the memory system is triggered. Particularly, the valid data sets are moved from the to-be-collected VBs. A target VB refers to a VB to which the valid data sets need to be programmed when garbage collection of the memory system is triggered. Particularly, the valid data sets are moved to the target VB.

It should be appreciated that a memory may include a system pool and a user pool, where the system pool may be used to store system data and the user pool may be used to store user data. The system pool and the user pool of the memory may be managed in units of VBs. In embodiments of the present disclosure, the garbage collection for VBs located in the user pool is taken as an illustrative example. Therefore, both the to-be-collected VBs and the target VBs are located in the user pool.

In embodiments of the present disclosure, the number of to-be-collected VBs, the number of dies of a to-be-collected VB, the number of target VBs, and the number of target die groups are not specifically limited.

In some embodiments, a target VB may include two target die groups, and each target die group may include two target dies. For example, the first target die group includes die0 and die1, and the second target die group includes die2 and die3.

In some other embodiments, a target VB may include four target die groups, and each target die group may include two target dies. For example, the first target die group includes die0 and die1, the second target die group includes die2 and die3, the third target die group includes die4 and die5, and the fourth target die group includes die6 and die7.

In embodiments of the present disclosure, the memory system may include NAND memory.

Figure 3:
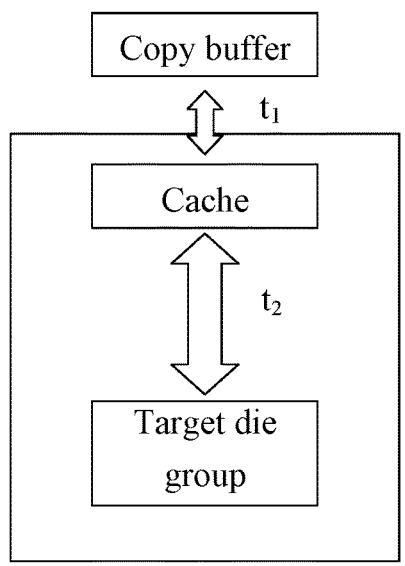
FIG. 3 is a first block diagram illustrating a method for garbage collection of a memory system according to an embodiment of the present disclosure.
Figure 3:
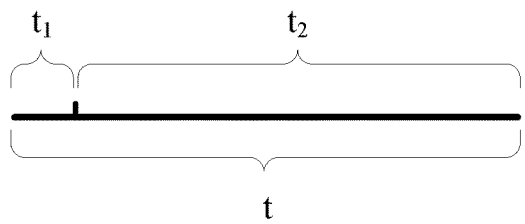

FIG. 3 is a first block diagram illustrating a method for garbage collection of a memory system according to an embodiment of the present disclosure. The method for garbage collection of the memory system according to an embodiment of the present disclosure will be briefly described below in combination with FIG. 3.

In an embodiment of the present disclosure, at step S201, a to-be-collected VB includes N valid data sets, and the N valid data sets in the to-be-collected VB are sequentially read out to a copy buffer.

In an embodiment of the present disclosure, at step S202, a valid data set in the copy buffer is transferred to a corresponding cache, and a next valid data set is read out to the copy buffer. Referring to FIG. 3(a), the time duration for transferring the valid data set in the copy buffer to the corresponding cache is $t_1$.

It should be appreciated that due to the limited storage capacity of the copy buffer, each time a valid data set in the to-be-collected VB is read out to the copy buffer, the next valid data set may not be read out to the copy buffer until the current valid data set in the copy buffer has been transferred to the corresponding cache. As an intermediate buffer for garbage collection, the copy buffer may be released after the current valid data set is transferred to the cache, so that the next valid data set may be read out to the copy buffer.

In an embodiment of the present disclosure, at step S203, the valid data set in the cache is programmed into the corresponding target die group of the target VB. With reference to FIG. 3(a), the time duration for programming the valid data set in the cache into the corresponding target die group of the target VB is $t_2$.

In an embodiment of the present disclosure, the time duration for reading the valid data set in the to-be-collected VB out to the copy buffer is less than the time duration for programming the valid data set in the copy buffer into the corresponding target die group of the target VB. That is, the time duration for reading the valid data set is much less than the time duration for programming the valid data set into the target die group. In an embodiment of the present disclosure, at least at a time instant, the process of programming the current valid data set from the cache into the target die group corresponding to the cache has not ended and the process of reading the next valid data set from the to-be-collected VB out to the copy buffer has started. That is to say, the time period for programming consecutive valid data sets from the cache to the target die group corresponding to the cache and the time period for reading the consecutive valid data sets from the to-be-collected VB to the copy buffer at least partially overlap. In other words, in embodiments of the present disclosure, the programming operation of the current valid data set and the reading operation of the next valid data set may be processed in parallel, so that the reading operation of the next valid data set may be started without waiting for the completion of both the reading operation and the programming operation for the current valid data set. In this way, he processing speed of garbage collection may be effectively improved.

For example, the to-be-collected VB may include valid data sets A and B, each of the valid data sets A and B may include a plurality of valid data. For example, for the valid data set A, the plurality of valid data of the valid data set A are read out to the copy buffer sequentially until all the valid data of the valid data set A are stored in the copy buffer. Then, the plurality of valid data of the valid data set A in the copy buffer are transferred to the cache sequentially until all the valid data of the valid data set A are stored in the cache. Finally, the plurality of valid data of the valid data set A in the cache are sequentially stored into the target die group. In other words, the garbage collection is performed in units of the valid data set A. After all the valid data of the valid data set A are read out to the copy buffer, the valid data set A in the copy buffer are started to be transferred to the cache. After all the valid data of the valid data set A are transferred to the cache, the valid data set A in the cache are started to be stored into the target die group.

Here, the process of reading the plurality of valid data of the valid data set B from the to-be-collected VB to the copy buffer has started while the process of programming the plurality of valid data of the valid data set A from the cache into the target die group corresponding to the cache has not ended. More specifically, at a certain time instant, the first valid data of the valid data set B is being read from the to-be-collected VB to the copy buffer while the 20th valid data of the valid data set A is being programmed from the cache to the target die group corresponding to the cache.

As another example, the to-be-collected VB may include valid data sets A and B, each of the valid data sets A and B may include a plurality of valid data subsets. For example, for the valid data set A, the valid data set A may include a plurality of valid data subsets. A first valid data subset of the valid data set A is read out to the copy buffer. The first valid data subset in the copy buffer is transferred to the cache while a second valid data subset of the valid data set A is read out to the copy buffer. The first valid data subset in the cache is stored into the target die group while a third valid data subset of the valid data set A is read out to the copy buffer. The number of valid data subsets included in the valid data set A and the number of valid data included in a valid data subset are not specifically limited in embodiments of the present disclosure. In some embodiments, a valid data subset may include one valid data.

In an embodiment of the present disclosure, a part of valid data subsets of the valid data set A may be transferred to the cache without waiting for all the valid data subsets of the valid data set A to be completely read out to the copy buffer. And a part of valid data subsets of the valid data set A may be stored into the target die group without waiting for all the valid data subsets of the valid data set A to be completely transferred to the cache.

Here, the process of reading the plurality of valid data subsets of the valid data set B from the to-be-collected VB to the copy buffer has started while the process of programming the plurality of valid data subsets of the valid data set A from the cache into the target die group corresponding to the cache has not ended. More specifically, at a certain time instant, the first valid data subset of the valid data set B is being read from the to-be-collected VB to the copy buffer while a certain valid data subset of the valid data set A is being programmed from the cache to the target die group corresponding to the cache.

With reference to FIG. 3 (c), the time duration for transferring the valid data set in the copy buffer to the corresponding cache is less than the time duration for programming the valid data set in the cache to the corresponding target die group of the target VB, that is, $t_1 < t_2$.

In embodiments of the present disclosure, the total time duration t for programming a valid data set in the copy buffer into the corresponding target die group of the target VB includes the sum of the time duration $t_1$ for transferring the valid data set in the copy buffer to the corresponding cache and the time duration $t_2$ for programming the valid data set in the cache into the corresponding target die group of the target VB, that is, $t=t_1+t_2$.

In embodiments of the present disclosure, the time duration $t_1$ for storing the valid data set in the copy buffer into the cache is less than the time duration $t_2$ for programming the valid data set in the cache into the corresponding target die group of the target VB. In embodiments of the present disclosure, because the time duration $t_1$ for transferring the valid data set in the copy buffer to the corresponding cache is less than the time duration $t_2$ for programming the valid data set in the cache into the corresponding target die group of the target VB, at least at a certain time instant, the process of programming the current valid data set from the cache to the target die group corresponding to the cache has not ended while the process of programming the next valid data set from another cache to the target die group corresponding to the another cache has started. That is, the time periods for respectively programming consecutive valid data sets from the caches to the target die groups corresponding to the caches at least partially overlap. In other words, in embodiments of the present disclosure, the programming operation of the current valid data set and the programming operation of the next valid data set may be performed in parallel, so that the reading operation and the programming operation for the next valid data set may be started without waiting for the completion of both the reading operation and the programming operation for the current valid data set. In this way, the processing speed of garbage collection may be effectively improved.

For example, the to-be-collected VB may include valid data sets A and B, each of valid data sets A and B may include a plurality of valid data. For example, for the valid data set A, it is read out to the copy buffer firstly, then it is transferred from the copy buffer to the cache, and finally it is stored from the cache into the target die group. While the process of programming the plurality of valid data of the valid data set A from the cache into the target die group corresponding to the cache has not ended, the process of programming the plurality of valid data of the valid data set B from another cache into the target die group corresponding to the another cache has started. More specifically, if the valid data sets A and B each includes 96 valid data, there may be a certain time instant, at which the 45th valid data of the valid data set A is being programmed from the cache into the target die group corresponding to the cache while the first valid data of the valid data set B is being programmed from another cache into the target die group corresponding to the another cache.

It should be appreciated that in embodiments of the present disclosure, consecutive valid data sets need to be programmed into different target die groups of the target VB. As an example, the current valid data set is programmed from the first cache into the first target die group corresponding to the first cache, and the next valid data set needs to be transferred to another cache than the first cache, and then be programmed into another target die group than the first target die group.

In embodiments of the present disclosure, the caches are corresponding respectively to the target die groups, where one cache corresponds to one target die group. Or, the caches are corresponding respectively to the target dies of the target die group, where one cache corresponds to one target die. For example, if a target die group includes two target dies, the target die group may correspond to two caches.

In an embodiment of the present disclosure, before step S201, the method can further include the following steps. For example, the logical addresses of all valid data in the to-be-collected VB are obtained, and are sequentially programmed into a logical address queue of the to-be-collected VB. Further, the logical addresses in the logical address queue are sorted, so as to determine N logical address sets. Finally, each of the logical address sets is assigned to a respective target die group of the target VB, where each logical address set corresponds to one target die group.

In an embodiment of the present disclosure, after the logical addresses in the logical address queue are sorted to determine N logical address sets, the method further comprises the following steps. For example, N valid data sets in the to-be-collected VB are obtained according to the N logical address sets, where the N logical address sets correspond respectively to the N valid data sets. The valid data sets corresponding to consecutive logical address sets of the N logical address sets are programmed into different target die groups.

Figure 4:
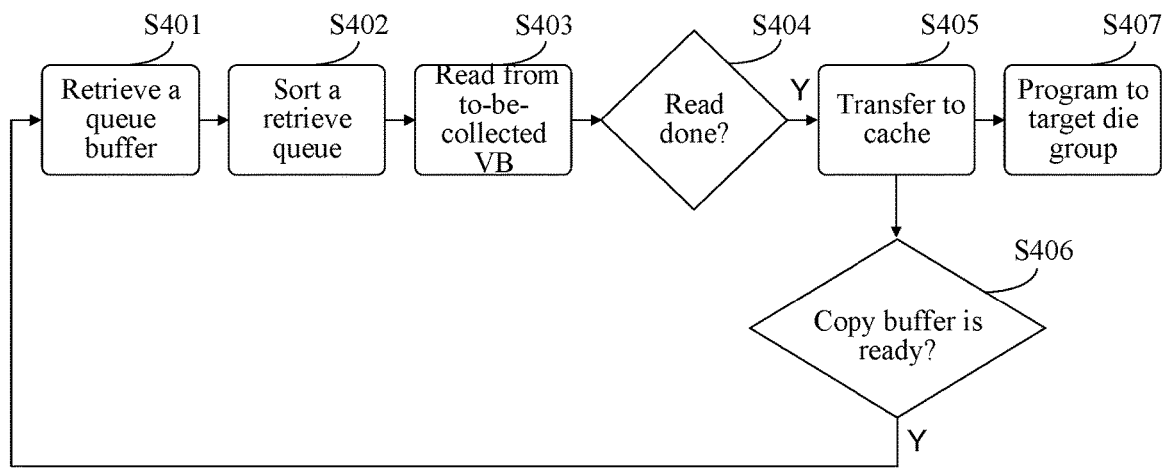
FIG. 4 is a second block diagram illustrating a method for garbage collection of a memory system according to an embodiment of the present disclosure.

FIG. 4 is a second block diagram illustrating a method for garbage collection of a memory system according to an embodiment of the present disclosure. The method for garbage collection of the memory system according to an embodiment of the present disclosure will be described in detail below in combination with FIG. 4.

As shown in FIG. 4, at step S401, a queue buffer is retrieved. Particularly, logical addresses/physical addresses of all valid data in a to-be-collected VB are obtained and are programmed into a retrieve queue buffer sequentially to form a logical address/physical address queue.

Here, the logical address and physical address of the valid data refer to the address information of the valid data in the to-be-collected VB. The physical address refers to the absolute address of the valid data in the to-be-collected VB, and the logical address refers to the address of the valid data in the to-be-collected VB that may be identified by the program of the memory system. The logical address and physical address of the valid data are corresponding to each other. The physical address of the valid data may be obtained according to the logical address of the valid data, and then the valid data in the to-be-collected VB may be obtained. Therefore, at step S401, the logical addresses of all valid data in the to-be-collected VB may be obtained and be programmed into the retrieve queue buffer sequentially to form a logical address queue.

In the garbage collection method of the memory system according to an embodiment of the present disclosure, a logical address/physical address queue may be formed, the logical addresses/physical addresses in the logical address/physical address queue may be sorted so as to determine logical address/physical address sets, and valid data sets may be determined according to the logical address/physical address sets.

At step S402, the retrieve queue is sorted. Particularly, the logical address queue is sorted to determine N logical address sets. Each of the logical address sets is assigned to a respective target die group of the target VB, where each logical address set corresponds to one target die group. N valid data sets in the to-be-collected VB are obtained according to the N logical address sets, where the N logical address sets correspond respectively to the N valid data sets. The valid data sets corresponding to consecutive logical address sets of the N logical address sets are programmed into different target die groups.

Here, the logical address sets correspond respectively to the valid data sets. After the logical address queue is sorted to determine the N logical address sets, the N valid data sets may be obtained according to the N logical address sets. Assigning each of the logical address sets to a respective one of the target die groups of the target VB is equivalent to assigning each of the valid data sets to a respective one of the target die groups of the target VB.

It should be appreciated that the valid data sets corresponding to the consecutive logical address sets of the N logical address sets are programmed into different target die groups. As an example, the N logical address sets include a first logical address set, a second logical address set, . . . a Nth logical address set, where the first logical address set is programmed into the first target die group, then the second logical address set may only be programmed into a target die group other than the first target die group.

At step S403, reading from the to-be-collected VB is performed. Particularly, the valid data sets in the to-be-collected VB are read according to the logical address sets, and the valid data sets in the to-be-collected VB are sequentially read out to the copy buffer.

Figure 5:
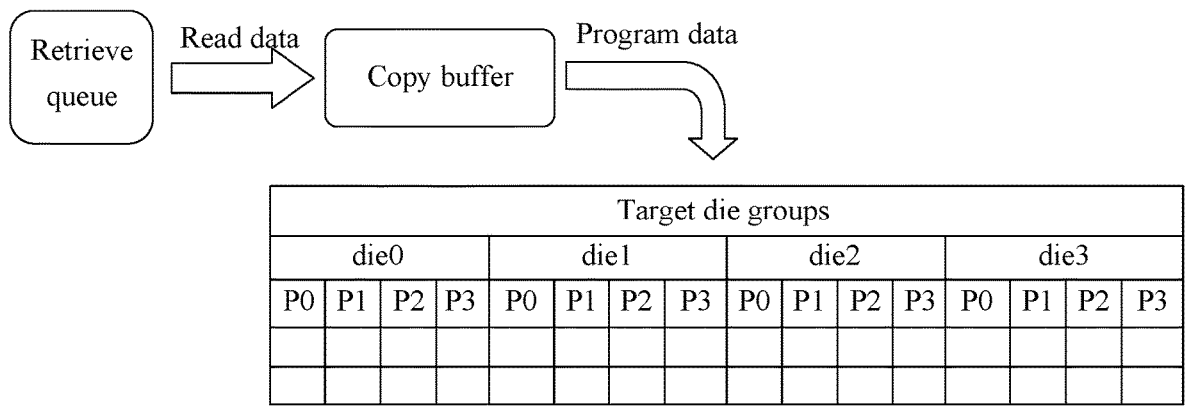
FIG. 5 is a third block diagram illustrating a method for garbage collection of a memory system according to an embodiment of the present disclosure.

FIG. 5 is a third block diagram illustrating a method for garbage collection of a memory system according to an embodiment of the present disclosure. As shown in FIG. 5, a retrieve queue refers to a logical address queue. The logical address queue is sorted to determine N logical address sets. Reading data refers to obtaining N valid data sets according to the N logical address sets and reading the N valid data sets sequentially out to the copy buffer.

At step S404, it is determined whether the reading of a valid data set is completed. If the determination is "Yes", it proceeds to step S405. If the determination is "No", the reading operation is continued until the reading of the valid data set is complete. Here, completing the reading of a valid data set refers to completing the reading of one valid data set. Particularly, one valid data set is read out to the copy buffer.

At step S405, the data is transferred to the cache. Particularly, the valid data set in the copy buffer is transferred to the corresponding cache.

At step S406, it is determined whether the copy buffer is in ready state. Particularly, it is determined whether the copy buffer is in a state in which the next valid data set may be programmed into it. If the determination is "Yes", it proceeds to step S401. If the determination is "No", it waits for the valid data set in the copy buffer to be transferred to the cache until the copy buffer is in ready state.

In some embodiments, before reading the next valid data set out to the copy buffer, the following steps are included. For example, it is determined whether the copy buffer is ready state; and, if the copy buffer is in ready state, the next valid data set is read out to the copy buffer. Here, whether the copy buffer is in ready state refers to whether the copy buffer is in a state in which it is available to receive the next valid data set. Determining whether the copy buffer is in ready state depends on the type of copy buffer.

In some embodiments, if the copy buffer is a NAND memory, after the current valid data set in the copy buffer is transferred to the cache, the current valid data set in the copy buffer needs to be erased before the next valid data set may be read out to the copy buffer. That is to say, if the copy buffer is a NAND memory, after the current valid data set in the copy buffer is transferred to the cache, the copy buffer is not in ready state until an erase operation is performed to the copy buffer.

In other embodiments, if the copy buffer is a Dynamic Random Access Memory (DRAM), the next valid data set may be read out to the copy buffer once the current valid data set in the copy buffer is transferred to the cache. That is to say, if the copy buffer is a DRAM, the copy buffer is in ready state once the current valid data set in the copy buffer is transferred to the cache. Here, it is not necessary to erase the current valid data set in the copy buffer, the next valid data set may be read directly out to the copy buffer, and the next valid data set may overwrite the current valid data set in the copy buffer.

In some embodiments, determining whether the copy buffer is in ready state can include determining whether the copy buffer is in ready state according to the ratio between the portion of the current valid data set that has been transferred to the corresponding cache and the portion of the current valid data set that has not been transferred to the corresponding cache.

As described above, if the copy buffer is DRAM, it may determine that the copy buffer is in ready state as long as determining that the valid data set in the copy buffer has been transferred to the cache. However, considering that the use of the copy buffer is in such a manner that portions of the copy buffer are sequentially occupied from front to back, it may determine that the copy buffer is in ready state without needing to wait for the current valid data set in the copy buffer to be completely transferred to the cache. Here, it may be determined that the copy buffer is in ready state according to the fact that the portion of the current valid data set that has been transferred to the corresponding cache is larger than the portion of the current valid data set that has not been transferred to the corresponding cache.

Still referring to FIG. 3 (b), the first target die group includes two target dies. Particularly the first target die group includes die0 and die1. If the storage capacity of a valid data set is 24 pages, 12 pages of the valid data set are transferred from the copy buffer to a corresponding cache and then are programmed into die0, the other 12 pages of the valid data set are transferred from the copy buffer to a corresponding cache, and then are programmed into die1. For example, a flag information is returned when each of the first 11 pages of the 12 pages is transferred from the copy buffer to the corresponding cache. Each time the flag information is obtained, it indicates that the valid data of a page has been transferred from the copy buffer to the corresponding cache. However, the flag information for the 12th page is not returned until the 12 pages of the valid data set are programmed into the target die. Here, considering that the use of the copy buffer is in such a manner that portions of the copy buffer are occupied sequentially from front to back, the time duration for transferring the valid data of a certain page from the copy buffer to the cache is very short, and it is sufficient for the 12th page to be transferred from the copy buffer to the corresponding cache during the use process of the previous idle portions, therefore when determining that the first 11 pages of the current valid data set have been transferred from the copy buffer to the corresponding cache, this determination may be used as an indication that the 12 pages of the valid data set have been transferred from the copy buffer to the corresponding cache.

At step S407, programming to the target die group is performed. Particularly, the valid data set in the cache is programmed into the corresponding target die group. While determining whether the copy buffer is in a state in which the next valid data set may be programmed into it at step S406, the current valid data set in the cache may be programmed into the corresponding target die group. That is to say, steps S406 and S407 are performed simultaneously or in parallel.

Still referring to FIG. 5, programming data comprises transferring the valid data set in the copy buffer to the cache and programming the valid data set in the cache to the corresponding target die group of the target VB. FIG. 5 shows that the target VB includes two target die groups, and each target die group may include two dies. Particularly, the first die group includes die0 and die1, and the second die group includes die2 and die3. Each die may include four planes, that is, P0, P1, P2 and P3.

In an embodiment of the present disclosure, when programming to the first die group of the target VB is to be performed, the retrieve queue needs to provide the first valid data set to be programmed into the first die group. When programming to the second die group of the target VB is to be programmed, the retrieve queue needs to provide the second valid data set to be programmed into the second die group. That is to say, the retrieve queue is sorted. The retrieve queue may include the first valid data sets and the second valid data sets arranged alternately. The first valid data sets and the second valid data sets are programmed into the first die group and the second die group respectively. The programming operations are alternately performed between the first die group and the second die group, and the time period for programming the first valid data sets into the first die group and the time period for programming the second valid data sets into the second die group overlaps at least partially.

Figure 6:
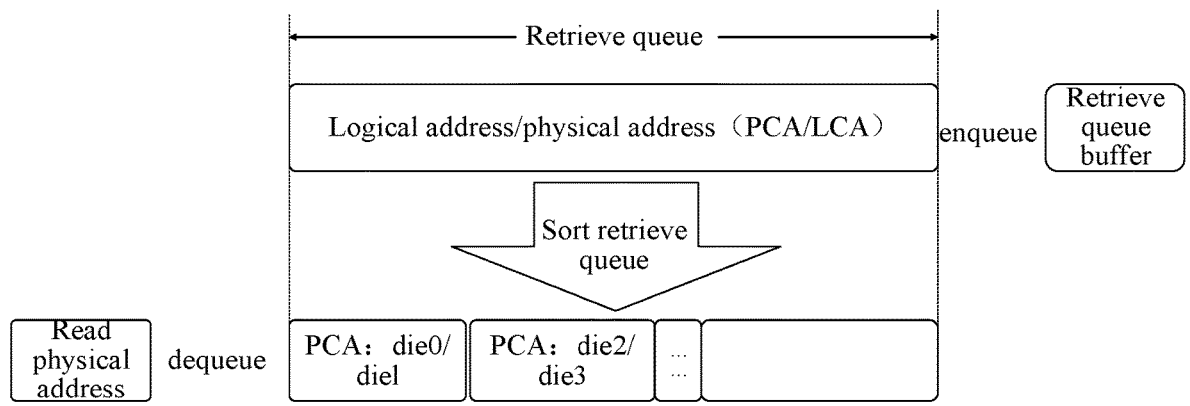
FIG. 6 is a block diagram illustrating a process for sorting a retrieve queue according to an embodiment of the present disclosure.

FIG. 6 is a block diagram illustrating a process for sorting a retrieve queue according to an embodiment of the present disclosure. As shown in FIG. 6, the logical address/physical address pairs (PCA/LCA pairs) of all valid data in a to-be-collected VB are obtained and programmed into a retrieve queue buffer. The enqueueing refers to sequentially programming the logical address/physical address pairs of the valid data in the retrieve queue buffer into the retrieve queue.

It should be appreciated that due to the limited storage capacity of the retrieve queue, the retrieve queue may not be able to store the logical address/physical address pairs of all the valid data. Therefore, the logical address/physical address pairs of valid data in the retrieve queue are dynamically updated. When the retrieve queue is fully filled for the first time by sequentially programming the logical address/physical address pairs of valid data into the retrieve queue, it is needed to wait for the logical address/physical address pairs of a part of valid data to be read out (i.e., dequeue). The logical address/physical address pairs of valid data may continue to be programmed into the retrieve queue (i.e., enqueue) after spare space is released in the retrieve queue.

Still referring to FIG. 6, sorting the retrieve queue refers to sorting the logical address/physical address pairs in the retrieve queue according to which of the target die groups the valid data corresponding to the logical address/physical address pairs will be programmed into, so as to determine a plurality of logical address/physical address sets. In this way, each of the logical address/physical address sets corresponds to one of the target die groups. Specifically, a valid data set may be obtained according to each logical address/physical address set and may be programmed into a target die group.

It should be appreciated that when the logical address/physical address pairs of valid data are sequentially programmed into the retrieve queue, the valid data corresponding to any two consecutive logical address/physical address pairs may be programmed into a same target die group or into different target die groups. For example, in the retrieve queue, the first valid data will be programmed into die0, the second valid data will be programmed into die1, the third valid data will be programmed into die2, the fourth valid data will be programmed into die0, etc. Accordingly, the first valid data and the second valid data will be programmed into the first target die group (including die0 and die1), the third valid data will be programmed into the second target die group (including die2 and die3), and the fourth valid data will be programmed into the first target die group (including die0 and die1). Therefore, the retrieve queue may be sorted to ensure that a valid data set corresponding to a logical address/physical address set composed of a preset number of logical address/physical address pairs is programmed into the same target die group, and valid data sets corresponding to the consecutive logical address/physical address sets are programed into different target die groups. Here, the logical address/physical address sets correspond respectively to the valid data sets. In other words, a valid data set composed of a preset number of valid data is programmed into the same target die group, and the consecutive valid data set is programmed into a different target die group.

Figure 7:
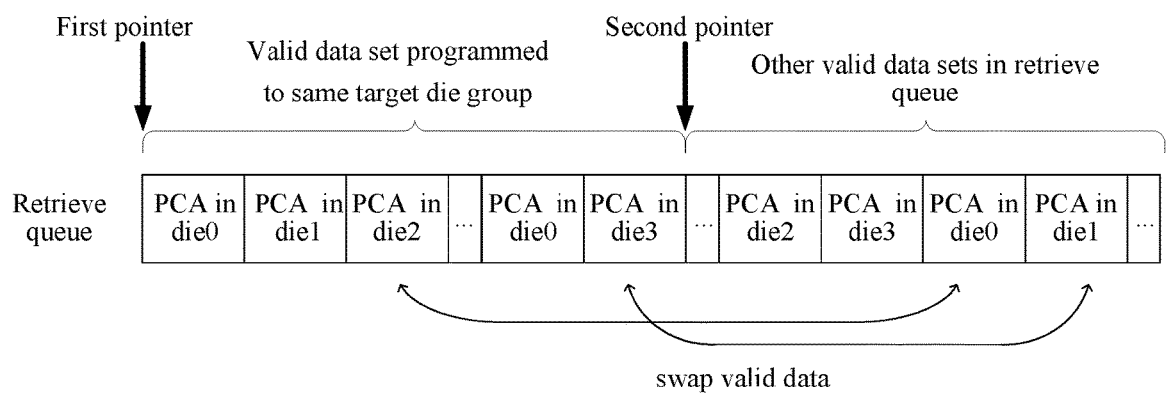
FIG. 7 is a block diagram illustrating a process for determining a logical address set corresponding to a current target die group according to an embodiment of the present disclosure.
Figure 8:
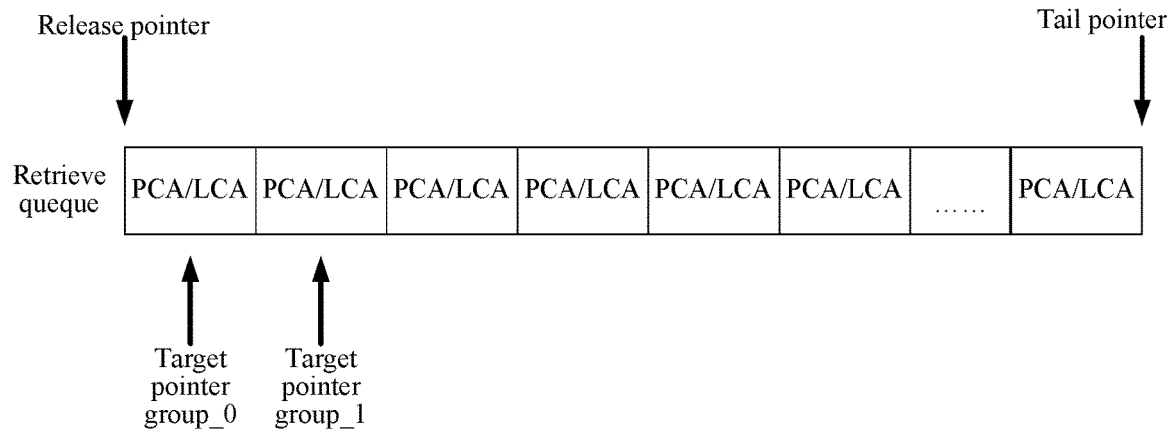
FIG. 8 is a block diagram illustrating a process for determining a logical address set corresponding to a current target die group according to an embodiment of the present disclosure.

FIG. 7 is a block diagram illustrating a process for determining a logical address set corresponding to a current target die group according to an embodiment of the present disclosure. FIG. 8 is a block diagram illustrating a process for determining a logical address set corresponding to a current target die group according to another embodiment of the present disclosure. It will be described hereafter in detail in combination with FIGS. 7 and 8 how to sort the retrieve queue so as to determine a plurality of logical address/physical address sets in the garbage collection method according to an embodiment of the present disclosure.

Referring to FIG. 7, the method for determining a logical address set corresponding to the current target die group comprises: using a first pointer and a second pointer to retrieve each logical address starting from a first position and a second position of the logical address queue respectively, where the first position and the second position are set apart by a preset number of logical addresses.

If a logical address retrieved by the first pointer does not belong to the current target die group and a logical address retrieved by the second pointer belongs to the current target die group, the logical addresses retrieved by the first pointer and the second pointer are exchanged. This process continues until the first pointer arrives at the second position, so that a logical address set corresponding to the current target die group may be determined.

Here, there are a preset number of logical address/physical address pairs between the first position and the second position. The preset number equals to the number of the logical address/physical address pairs included in a logical address/physical address set, and the preset number equals to the number of the valid data included in a valid data set. For example, if a valid data set includes 96 valid data, then a logical address/physical address set includes 96 logical address/physical address pairs, and then there are 96 logical address/physical address pairs between the first pointer and the second pointer.

Here, the first pointer and the second pointer retrieve each logical address/physical address pair starting from the first and second positions of the retrieve queue respectively. If a logical address/physical address pair retrieved by the first pointer does not belong to the current target die group and a logical address/physical address pair retrieved by the second pointer belongs to the current target die group, the logical address/physical address pairs retrieved by the first pointer and the second pointer are exchanged, which is equivalent to exchanging the valid data corresponding to the logical address/physical address pairs retrieved by the first and second pointers. When the first pointer arrives at the second position, the preset number of logical address/physical address pairs between the first position and the second position form a valid data set, and all valid data of the valid data set are programmed into the same target die group.

For example, if a valid data set includes 96 valid data, the method for determining the logical address/physical address set corresponding to the first target die group die0/die1 can include the following steps: a first pointer may be set at the queue head of the logical address/physical address queue, and a second pointer may be set at a position which is apart from the first pointer by 96 logical address/physical address pairs; the first pointer moves forward and stops when retrieving a logical address/physical address pair that does not belong to the first target die group die0/die1; the second pointer moves forward and stops when retrieving a logical address/physical address pair that belongs to the first target die group die0/die1; the logical address/physical address pairs retrieved by the first pointer and the second pointer are swapped; the above steps are repeated until the first pointer arrives at the starting position of the second pointer, then the valid data corresponding to the 1st to 96th logical address/physical address pairs of the logical address/physical address queue belong to the first target die group die0/die1. In other words, the 1st to 96th logical address/physical address pairs of the logical address/physical address queue compose a logical address/physical address set. The logical address/physical address set corresponds to a valid data set, which belongs to the first target die group die0/die1.

With reference to FIG. 8, a method for determining a logical address set corresponding to a current target die group includes the following steps: a plurality of target pointers corresponding to respective target die groups of a target VB are set, where each of the target pointers corresponds to one of the target die groups; a target pointer is used to retrieve logical addresses belonging to a target die group corresponding to the current target pointer from the logical address queue; if the number of the logical addresses retrieved by the target pointer meets a preset number, the logical address set corresponding to the target die group which corresponds to the current target pointer is determined; if the number of the logical addresses retrieved by the current target pointer does not meet the preset number, another target pointer is used to retrieve the logical addresses belonging to a target die group corresponding to the another target pointer from the logical address queue until the sum of the number of logical addresses retrieved by the current target pointer and the number of logical addresses retrieved by the another target pointer meets the preset number, so that the logical address set corresponding to the target die group which corresponds to the current target pointer may be determined.

Here, for example, the target VB includes two target die groups, each target die group includes two target dies. Particularly, the first target die group includes die0 and die1, and the second target die group includes die2 and die3. Two target pointers corresponding to the two target die groups of the target VB may be set. Particularly, the target pointer group_0 corresponds to the first target die group die0/die1, and the target pointer group_1 corresponds to the second target die group die2/die3.

For example, if a valid data set includes 96 valid data, a method for determining the logical address/physical address set corresponding to the first target die group die0/die1 comprises the following steps: a target pointer group_0 takes the queue head of the logical address/physical address queue as a starting position, and moves forward to retrieve the logical address/physical address pairs belonging to the first target die group die0/die1. If the number of the logical address/physical address pairs accumulatively retrieved by the target pointer group_0 reaches 96, the logical address/physical address set corresponding to the first target die group die0/die1 is determined. Here, the logical address/physical address set retrieved by the target pointer group_0 corresponds to a valid data set, which belongs to the first target die group die0/die1. If the target pointer group_0 arrives at the queue tail and the cumulative number of the logical address/physical address pairs retrieved by the target pointer group_0 is less than 96, then the target pointer group_1 may be used to move forward to retrieve the logical address/physical address pairs belonging to the second target die group die2/die3 until the number of the logical address/physical address pairs retrieved by both the target pointer group_0 and the target pointer group_1 reaches 96, so that the logical address/physical address set is determined.

Still referring to FIG. 8, in some embodiments, the method also comprises the following steps a release pointer is set, when a target pointer is retrieving a logical address belonging to a target die group corresponding to the current target pointer from the logical address queue, the position of the target pointer is set as the target position of the release pointer, and the release pointer moves from a current position to the target position to release at least a part of logical addresses between the current position and the target position, and the logical addresses of other valid data in the to-be-collected VB are programmed into the logical address queue.

As described above, the release pointer is configured to move following the target pointer. For the logical address/physical address pairs that have been retrieved and determined by the target pointer to be belonging to the target die group, the release pointer may be used to release these logical address/physical address pairs that have been determined to be belonging to the target die group, so as to free up spare space for the retrieve queue in time and facilitate programming the logical address/physical address pairs of other valid data in the to-be-collected VB into the logical address/physical address queue.

For example, the target pointer group_0 takes the queue head of the logical address/physical address queue as the starting position, and moves forward to retrieve the logical address/physical address pairs belonging to the first target die group die0/die1. The release pointer (for example, the queue head pointer) is configured to move following the target pointer, and a queue tail pointer is set to be at the end of the logical address/physical address queue. The release pointer is used to release the logical address/physical address pairs belonging to the first target die group die0/die1 and retrieved by the target pointer group_0, so as to free up spare space for the logical address/physical address queue in time. The logical address/physical address pairs of other valid data in the to-be-collected VB are programmed into the logical address/physical address queue from the position of the queue tail pointer.

In embodiments of the present disclosure, each of the target pointers is used to retrieve, in the retrieve queue, the logical address/physical address pairs belonging to the target die group corresponding to the current target pointer, the respective numbers of the logical address/physical address pairs belonging to the target die groups corresponding respectively to the respective target pointers may be considered. The respective numbers of the logical address/ physical address pairs belonging to the target die groups corresponding respectively to the respective target pointers may be summed to obtain the number of the valid data, that is, the storage capacity of the retrieve queue.

Figure 9:
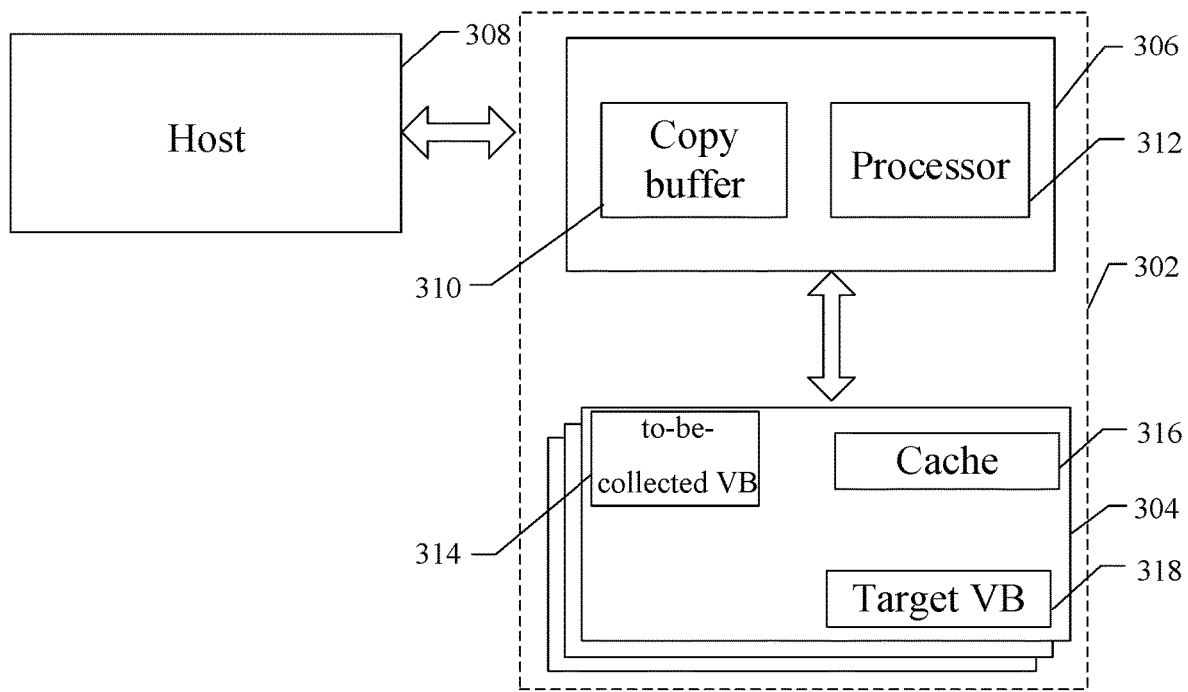
FIG. 9 is a block diagram illustrating a memory system according to an embodiment of the present disclosure.

FIG. 9 is a diagram of a memory system according to an embodiment of the present disclosure. As shown in FIG. 9, an embodiment of the present disclosure provides a memory system. The memory system 300 comprises a controller 306 and a memory 304. The controller 306 comprises a processor 312 and a copy buffer 310. The memory 304 comprises a VB 314 to be collected, a cache 316, and a target VB 318. The processor 312 is configured to read N valid data sets in the to-be-collected VB 314 out to the copy buffer 310 sequentially, where N is an integer greater than or equal to 2, transfer a valid data set in the copy buffer 310 to a corresponding cache 316, and read a next valid data set out to the copy buffer 310, and program the valid data set in the cache 316 to a corresponding target die group of the target VB 318, where the time period in which the current valid data set is programmed from the cache 316 to the target die group corresponding to the cache 316 overlaps at least partially with the time period in which the next valid data set is read from the to-be-collected VB 314 to the copy buffer 310.

The memory system 300 may be a mobile phone, a desktop computer, a laptop, a tablet computer, an in-vehicle computer, a game console, a printer, a positioning device, a wearable electronic device, an intelligent sensor, a virtual reality (VR) device, an augmented reality (AR) device, or any other suitable electronic device with a memory therein.

As shown in FIG. 9, the memory system 300 may include a host 308 and a memory subsystem 302. The memory subsystem 302 includes one or more memories 304, and the memory subsystem also includes a controller 306. The host 308 may be a processor (for example, a Central Processing Unit (CPU)) or a System on Chip (SoC) (for example, an Application Processor (AP)) of an electronic device. The host 308 may be configured to send data to the memory 304. Alternatively, the host 308 may be configured to receive data from the memory 304.

The memory 304 may be a NAND flash memory (for example, a three-dimensional (3D) NAND flash memory). The memory 304 may have a reduced leakage current from a drive transistor (e.g., a string driver) coupled to an unselected word line during an erase operation, allowing a further reduction in the size of the drive transistor.

In an embodiment of the present disclosure, the controller 306 is coupled to the host 308. The controller 306 may manage the data stored in the memory 304 and may communicate with the host 308.

In some embodiments, the controller 306 is designed to operate in a low duty cycle environment, such as a Secure Digital (SD) card, a Compact Flash (CF) card, a Universal Serial Bus (USB) flash drive, or other media for use in an electronic device such as a personal calculator, a digital camera, a mobile phone, and the like.

In some embodiments, the controller 306 is designed to operate in a Solid State Drive (SSD) or an embedded Multi-Media Card (eMMC) in a high duty cycle environment. The SSD or eMMC is used as a data memory for a mobile device such as a smart phone, a tablet computer, a laptop, and the like, and is used as an enterprise storage array.

The controller 306 may be configured to control operations of the memory 304, such as reading, erasing, and programming operations. The controller 306 may be configured to manage various functions for data stored or to be stored in the memory 304, including but not limited to bad block management, garbage collection, logical to physical address translation, wear leveling, and the like. In some embodiments, the controller 306 is configured to process Error Correcting Code (ECC) for data read from or programmed into the memory 304.

The controller 306 may also perform any other suitable function, such as formatting the memory 304. The controller 306 may communicate with an external device (e.g., a host 308) according to a specific communication protocol. For example, the controller 306 may communicate with an external device by means of at least one of various interface protocols, such as USB protocol, MMC protocol, Peripheral Component Interconnect (PCI) protocol, Peripheral Component Interconnect Express (PCI-E) protocol, Advanced Technology Attachment (ATA) protocol, serial ATA protocol, parallel ATA protocol, Small Computer System Interface (SCSI) protocol, Extended Small Device Interface (ESDI) protocol, Integrated Drive Electronics (IDE) protocol, Firewire protocol, etc.

The controller 306 and one or more memories 304 may be integrated into various types of storage devices, for example, may be included in the same package (for example, Universal Flash Storage (UFS) package or eMMC package). That is to say, the memory system 300 may be implemented and packaged into different types of terminal electronic products.

Figure 10A:
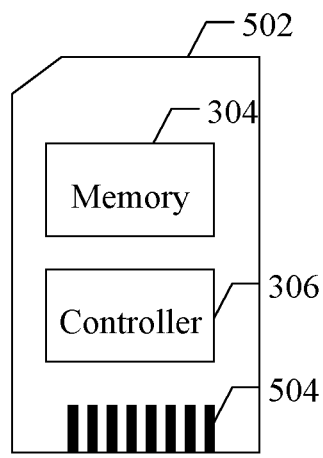
FIG. 10A is a block diagram illustrating a memory card according to an embodiment of the present disclosure.

In an example shown in FIG. 10A, the controller 306 and a single memory 304 may be integrated into a memory card 502. The memory card 502 may comprise Personal Computer Memory Card International Association (PCMCIA), CF card, Smart Media (SM) card, memory stick, multimedia card, Secure Digital (SD) card, UFS, etc. The memory card 502 may also include a memory card connector 504 for coupling the memory card 502 to a host, such as the host 308 in FIG. 9.

Figure 10B:
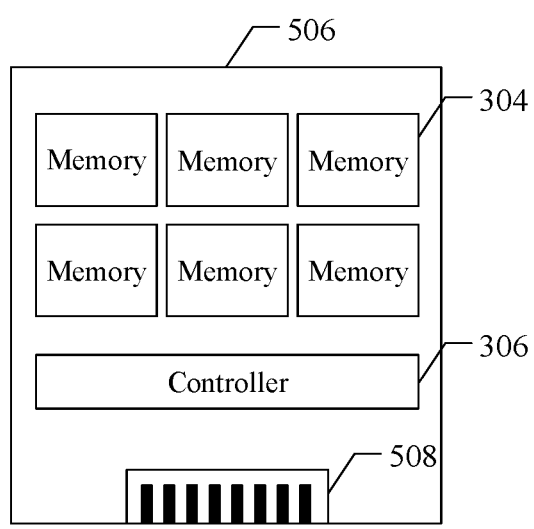
FIG. 10B is a block diagram illustrating a solid-state drive according to an embodiment of the present disclosure.

In another example shown in FIG. 10B, the controller 306 and a plurality of memories 304 may be integrated into a solid-state drive 506. The solid-state drive 506 may also include a solid-state drive connector 508 for coupling the solid-state drive 506 to a host, such as the host 308 in FIG. 9. In some embodiments, the storage capacity and/or operation speed of the solid-state drive 506 is greater than that of the memory card 502.

It is appreciated that the controller 306 may perform a garbage collection method according to any embodiment of the present disclosure.

In some embodiments, the time period in which a current valid data set is programmed from a corresponding cache to a target die group corresponding to the cache overlaps at least partially with the time period in which a next valid data set is programmed from a corresponding cache to a target die group corresponding to the cache.

In some embodiments, the processor is also configured to:
  obtain logical addresses of all valid data in the to-be-collected VB(s), and program them into a logical address queue of the to-be-collected VB(s) in turn;
  sort the logical addresses in the logical address queue to determine N logical address sets; and
  assign each of the logical address sets to a respective target die group of the target VB, where each logical address set corresponds to one of the target die groups.

In some embodiments, the processor is also configured to:
  obtain N valid data sets in the to-be-collected VB according to the N logical address sets, the N logical address sets correspond respectively to the N valid data sets, where valid data sets corresponding to consecutive logical address sets of the N logical address sets are programmed into different target die groups.

In some embodiments, the processor is also configured to:
  retrieve each logical address starting from a first position and a second position of the logical address queue by using a first pointer and a second pointer respectively, where the first and second positions are set apart by a preset number of logical addresses; and
  swap a logical address retrieved by the first pointer and a logical address retrieved by the second pointer if the logical address retrieved by the first pointer does not belong to the current target die group and the logical address retrieved by the second pointer belongs to the current target die group, until the first pointer arrives at the second position to determine a logical address set corresponding to the current target die group.

In some embodiments, the processor is also configured to set a plurality of target pointers corresponding respectively to target die groups of the target VB, each of the target pointers corresponds to one of the target die groups, retrieve, using a current target pointer, logical addresses belonging to a target die group corresponding to the current target pointer from the logical address queue, determining a logical address set corresponding to the target die group which corresponds to the current target pointer if the number of the logical addresses retrieved by the current target pointer meets a preset number, and retrieve, using another target pointer, logical addresses belonging to a target die group corresponding to the another target pointer from the logical address queue if the number of the logical addresses retrieved by the current target pointer does not meet the preset number, until the sum of the number of the logical addresses retrieved by the current target pointer and the number of the logical addresses retrieved by the another target pointer meets the preset number, so as to determine the logical address set corresponding to the target die group which corresponds to the current target pointer.

In some embodiments, the processor is also configured to set a release pointer; set a position of a current target pointer as a target position of the release pointer while retrieving, using the current target pointer, a logical address belonging to the target die group corresponding to the current target pointer from the logical address queue, and move the release pointer from a current position to the target position to release at least a part of logical addresses between the current position and the target position, and program the logical addresses of other valid data in the to-be-collected VB to the logical address queue.

In some embodiments, the time duration for transferring a valid data set to a corresponding cache is less than the time duration for programming the valid data set to a target die group corresponding to the cache.

In some embodiments, the processor is also configured to determine whether the copy buffer is in ready state, and read a next valid data set out to the copy buffer if the copy buffer is in the read state.

In some embodiments, the processor is also configured to determine whether the copy buffer is in ready state according to a ratio between a portion of the current valid data set that has been transferred to the corresponding cache and a portion of the current valid data set that has not been transferred to the corresponding cache.

An embodiment of the present disclosure also provides an electronic device, which includes a memory system according to the above described technical solution. The electronic device may comprise a mobile phone, a desktop, a tablet, a laptop, a server, an in-vehicle device, a wearable device, a portable power supply, or the like.

An embodiment of the present disclosure also provides a non-transitory computer-readable storage medium having computer programs stored thereon. The method for garbage collection of the memory system according to above described technical solution may be implemented by execution of the computer programs.

In embodiments of the present disclosure, the non-transitory computer-readable storage media may comprise: random access memory (RAM), memory, read only memory (ROM), electrically programmable ROM, electrically erasable programmable ROM, registers, hard disks, removable disks, read-only optical disks (CD-ROM), or any other form of media for program codes known in the technical field.

Embodiments of the present disclosure provide a memory system, a method and an electronic device for garbage collection of the memory system. In the method for garbage collection of the memory system according to an embodiment of the present disclosure, a time period in which a current valid data set is programmed from a cache into a target die group corresponding to the cache overlaps at least partially with a time period in which a next valid data set is read from a to-be-collected VB to a copy buffer. In other words, at least at a certain time instant, the process of programming the current valid data set from the cache to the target die group has not ended, and the process of reading the next valid data set from the to-be-collected VB to the copy buffer has started. In this way, the processing speed of garbage collection may be effectively improved.

It should be appreciated that "an embodiment" mentioned throughout the specification means that specific features, structures or characteristics related to an embodiment are included in at least one embodiment of the present disclosure. Therefore, "in an embodiment" mentioned throughout the specification may not necessarily refer to the same embodiment. Furthermore, these specific features, structures, or characteristics may be combined in one or more embodiments in any suitable manner. It should be appreciated that in various embodiments of the present disclosure, the serial numbers of the above described processes do not mean the order for performing the processes, and the order for performing the processes should be determined based on their functions and inherent logic, and should not constitute any restriction on the implementation of the embodiments of the present disclosure. The serial numbers of the embodiments of the present disclosure are only for purpose of description and do not represent that an embodiment is more advantageous than another embodiment.

The foregoing is directed to preferred embodiments of the present disclosure and does not limit the scope of the present disclosure. Any equivalent structural variation made using the contents of the description and the accompanying drawings under the inventive concept of the present disclosure, or any direct or indirect application in other related technical fields falls within the scope of patent protection of the present disclosure.

The invention claimed is:

1. A method for garbage collection of a memory system, comprising:
    reading N valid data sets in a to-be-collected virtual block (VB) of a memory out to a copy buffer sequentially, wherein N is an integer greater than or equal to 2;
    transferring a valid data set in the copy buffer to a corresponding cache, and reading a next valid data set out to the copy buffer; and
    programming the valid data set in the cache to a corresponding target die group of a target VB, wherein a time period in which a current valid data set is programmed from the cache to the target die group corresponding to the cache overlaps at least partially with a time period in which a next valid data set is read from the to-be-collected VB to the copy buffer,
    wherein the time period in which the current valid data set is programmed from a corresponding cache to the target die group corresponding to the cache overlaps at least partially with a time period in which a next valid data set is programmed from a corresponding cache to a target die group corresponding to the cache.

2. The method for garbage collection of the memory system according to claim 1, further comprising:
    obtaining logical addresses of all valid data in the to-be-collected VB, and programming them to a logical address queue of the to-be-collected VB sequentially;
    sorting the logical addresses in the logical address queue to determine N logical address sets; and
    assigning each of the logical address sets to one of target die groups of the target VB, wherein each of the logical address sets corresponds to one of the target die groups.

3. The method for garbage collection of the memory system according to claim 2, further comprising:
    obtaining the N valid data sets in the to-be-collected VB according to the N logical address sets, the N logical address sets correspond respectively to the N valid data sets, wherein valid data sets corresponding to consecutive logical address sets of the N logical address sets are programmed to different target die groups.

4. The method for garbage collection of the memory system according to claim 2, wherein sorting the logical addresses in the logical address queue to determine the N logical address sets comprises:
    retrieving each logical address starting from a first position and a second position of the logical address queue by using a first pointer and a second pointer respectively, wherein the first position and the second position are set apart by a preset number of logical addresses; and
    swapping a logical address retrieved by the first pointer and a logical address retrieved by the second pointer if the logical address retrieved by the first pointer does not belong to a current target die group and the logical address retrieved by the second pointer belongs to the current target die group, until the first pointer arrives at the second position, to determine a logical address set corresponding to the current target die group.

5. The method for garbage collection of the memory system according to claim 2, wherein sorting the logical addresses in the logical address queue to determine the N logical address sets comprises:
    setting a plurality of target pointers corresponding respectively to target die groups of the target VB, each of the target pointers corresponds to one of the target die groups;
    retrieving, using a current target pointer, logical addresses belonging to a target die group corresponding to the current target pointer from the logical address queue;
    determining a logical address set corresponding to the target die group which corresponds to the current target pointer if the number of the logical addresses retrieved by the current target pointer meets a preset number; and
    retrieving, using another target pointer, logical addresses belonging to a target die group corresponding to the another target pointer from the logical address queue if the number of the logical addresses retrieved by the current target pointer does not meet the preset number, until the sum of the number of the logical addresses retrieved by the current target pointer and the number of the logical addresses retrieved by the another target pointer meets the preset number, so as to determine the logical address set corresponding to the target die group which corresponds to the current target pointer.

6. The method for garbage collection of the memory system according to claim 5, further comprising:
    setting a release pointer;
    setting a position of a current target pointer as a target position of the release pointer while retrieving, using the current target pointer, a logical address belonging to the target die group corresponding to the current target pointer from the logical address queue; and
    moving the release pointer from a current position to the target position, to release at least a part of logical addresses between the current position and the target position, and program logical addresses of other valid data in the to-be-collected VB to the logical address queue.

7. The method for garbage collection of the memory system according to claim 1, wherein the time duration for transferring the valid data set to the corresponding cache is less than the time duration for programming the valid data set to the target die group corresponding to the cache.

8. The method for garbage collection of the memory system according to claim 1, further comprising:
    determining whether the copy buffer is in ready state; and
    reading the next valid data set out to the copy buffer if the copy buffer is in ready state.

9. The method for garbage collection of the memory system according to claim 8, wherein determining whether the copy buffer is in ready state comprises:
    determining whether the copy buffer is in ready state, according to a ratio between a portion of the current valid data set that has been transferred to the corresponding cache and a portion of the current valid data set that has not been transferred to the corresponding cache.

10. A memory system having a controller and a memory, the controller includes a processor and a copy buffer, and the memory includes a to-be-collected virtual block (VB), a cache and a target VB, wherein the processor is configured to:

read N valid data sets in the to-be-collected VB out to the copy buffer sequentially, where N is an integer greater than or equal to 2;

transfer a valid data set in the copy buffer to a corresponding cache, and read a next valid data set out to the copy buffer; and program the valid data set in the cache to a corresponding target die group of the target VB, wherein a time period in which a current valid data set is programmed from the cache to the target die group corresponding to the cache overlaps at least partially with a time period in which a next valid data set is read from the to-be-collected VB to the copy buffer, wherein the time period in which the current valid data set is programmed from a corresponding cache to the target die group corresponding to the cache overlaps at least partially with a time period in which a next valid data set is programmed from a corresponding cache to a target die group corresponding to the cache.

11. The memory system according to claim 10, wherein the processor is further configured to:

obtain logical addresses of all valid data in the to-be-collected VB, and programming them to a logical address queue of the to-be-collected VB sequentially;

sort the logical addresses in the logical address queue to determine N logical address sets; and assign each of the logical address sets to one of target die groups of the target VB, wherein each of the logical address set corresponds to one of the target die groups.

12. The memory system according to claim 11, wherein the processor is further configured to:

obtain the N valid data sets in the to-be-collected VB according to the N logical address sets, the N logical address sets correspond respectively to the N valid data sets, wherein valid data sets corresponding to consecutive logical address sets of the N logical address sets are programmed to different target die groups.

13. The memory system according to claim 11, wherein the processor is further configured to:

retrieve each logical address starting from a first position and a second position of the logical address queue by using a first pointer and a second pointer respectively, wherein the first position and the second position are set apart by a preset number of logical addresses; and swap a logical address retrieved by the first pointer and a logical address retrieved by the second pointer if the logical address retrieved by the first pointer does not belong to a current target die group and the logical address retrieved by the second pointer belongs to the current target die group, until the first pointer arrives at the second position, to determine a logical address set corresponding to the current target die group.

14. The memory system according to claim 11, wherein the processor is further configured to:

set a plurality of target pointers corresponding respectively to target die groups of the target VB, each of the target pointers corresponds to one of the target die groups;

retrieve, using a current target pointer, logical addresses belonging to a target die group corresponding to the current target pointer from the logical address queue;

determine a logical address set corresponding to the target die group which corresponds to the current target pointer if the number of the logical addresses retrieved by the current target pointer meets a preset number; and retrieve, using another target pointer, logical addresses belonging to a target die group corresponding to the another target pointer from the logical address queue if the number of the logical addresses retrieved by the current target pointer does not meet the preset number, until the sum of the number of the logical addresses retrieved by the current target pointer and the number of the logical addresses retrieved by the another target pointer meets the preset number, so as to determine the logical address set corresponding to the target die group which corresponds to the current target pointer.

15. The memory system according to claim 14, wherein the processor is further configured to:

set a release pointer;

set a position of a current target pointer as a target position of the release pointer while retrieving, using the current target pointer, a logical address belonging to the target die group corresponding to the current target pointer from the logical address queue; and move the release pointer from a current position to the target position, to release at least a part of logical addresses between the current position and the target position, and program logical addresses of other valid data in the to-be-collected VB to the logical address queue.

16. The memory system according to claim 10, wherein the time duration for transferring the valid data set to the corresponding cache is less than the time duration for programming the valid data set to the target die group corresponding to the cache.

17. The memory system according to claim 10, wherein the processor is further configured to:

determine whether the copy buffer is in ready state; and read the next valid data set out to the copy buffer if the copy buffer is in ready state.

18. The memory system according to claim 17, wherein the processor is further configured to:

determine whether the copy buffer is in ready state, according to a ratio between a portion of the current valid data set that has been transferred to the corresponding cache and a portion of the current valid data set that has not been transferred to the corresponding cache.

* * * * *